United States Patent
Ciccia et al.

[11] Patent Number: 5,829,244
[45] Date of Patent: Nov. 3, 1998

[54] FUEL PRESSURE ACTUATED AIR CONTROL FOR A COMBUSTION CHAMBER BURNER

[75] Inventors: Patrick Samuel André Ciccia, Paris; Michel Francois Le Texier, Epinay Sous Senart, both of France

[73] Assignee: Societe Natiional D'Etude et de Construction de Moteurs D'Aviation (S.N.E.C.M.A.), Valin, France

[21] Appl. No.: 853,484

[22] Filed: May 9, 1997

[30] Foreign Application Priority Data

May 9, 1996 [FR] France .................................. 96 05764

[51] Int. Cl.⁶ ...................................................... F02C 9/16
[52] U.S. Cl. ........................................ 60/39.23; 60/39.29
[58] Field of Search ................................ 60/39.23, 39.27, 60/39.29, 948

[56] References Cited

U.S. PATENT DOCUMENTS

| | | |
|---|---|---|
| 2,655,787 | 10/1953 | Brown ..................................... 60/39.23 |
| 3,577,878 | 5/1971 | Greenwood . |
| 3,691,761 | 9/1972 | Jackson et al. . |
| 3,731,484 | 5/1973 | Jackson et al. . |
| 4,202,170 | 5/1980 | Meyer ..................................... 60/39.23 |
| 5,018,354 | 5/1991 | Melchior et al. . |
| 5,159,807 | 11/1992 | Forestier . |
| 5,230,212 | 7/1993 | Forestier . |
| 5,373,693 | 12/1994 | Zarzalis et al. ........................ 60/39.23 |

FOREIGN PATENT DOCUMENTS 2270448 12/1975 France .
43 04 201 8/1984 Germany .

*Primary Examiner*—Louis J. Casaregola
*Attorney, Agent, or Firm*—Bacon & Thomas, PLLC

[57] ABSTRACT

A burner is disclosed for a combustion chamber of a gas turbine engine having a fuel injector mounted in an end of the combustion chamber for injecting fuel into the combustion chamber, the fuel injector having an associated air swirler for feeding primary air into the combustion chamber to mix with the fuel, and at least one fuel feed tube for supplying fuel, with an end of the fuel feed tube spaced from the fuel injector nozzle. A control member for controlling the amount of air entering the air swirler is located between the fuel injector nozzle and the end of the fuel feed tube, the control member having a passage to pass fuel from the fuel feed tube to the fuel injector nozzle. The control member is attached to the end of the fuel feed tube by an elastic bellows having a cross-sectional dimension D1 and to the fuel injector nozzle by a second elastic bellows having a cross-sectional dimension D2 such that D2>D1. When the fuel pressure in the passage is below a predetermined value, such as a under low operating conditions, the control member is moved towards the fuel injector so as to restrict the amount of air passing through the air swirler, thereby richening the mixture in the combustion chamber. As the engine operating speed increases, the fuel pressure in the passage also increases which causes movement of the control member away from the fuel injector towards the end of the fuel feed tube, opening the intakes of the air swirler.

7 Claims, 3 Drawing Sheets

FUEL PRESSURE ACTUATED AIR CONTROL FOR A COMBUSTION CHAMBER BURNER

BACKGROUND OF THE INVENTION

The present invention relates to a burner for a combustion chamber of a gas turbine engine in which the quantity of air passing through an air swirler associated with a fuel injector is controlled by the pressure of the fuel supplied to the fuel injector. In low power operating conditions, the air flow is minimized to richen the fuel/air mixture and under maximum power conditions, the air flow is maximized to lean the fuel/air mixture.

Gas turbine engines utilized in civilian and military aircraft must reduce the emissions of carbon dioxide and nitrogen oxides in order to meet present and future air pollution standards. The reduction of such emissions must be accomplished throughout the flight of the aircraft inclusive of take-off, climb, cruise and descent. In order to meet these emissions standards, the fuel and oxidizer (usually air) burned within the combustion chamber must be optimized under all operating conditions. In addition, smoke emissions from military aircraft must be rigorously minimized to improve the low visibility "stealth" characteristics of the aircraft.

The flow of air and the flow of fuel into the primary combustion zone of the combustion chamber vary greatly as a function of engine rotational speed and fuel feed conditions. The disparities in the air/fuel richness are great between low and full power operating modes of the engine. During low power operation, the air/fuel mixture is lean and the engine emits a large amount of carbon dioxide. During this operational phase, air flow, pressure, temperature and air/fuel richness are comparatively low and, as a result, the rate of combustion within the combustion chamber is also relatively low. Accordingly, the air flow must be limited during low power operation in order to enrich the fuel/air mixture in the combustion chamber primary zone. Moreover, the fuel must be injected in a relatively wide spray in order to increase the dwell time of the combustion gases in the chamber to insure complete combustion and minimize the emissions.

Under high, or full power operating conditions, the air/fuel mixture is relatively rich. Under these conditions, the exhaust emissions are high in both visible smoke and nitrogen oxides. In order to reduce these emissions, the flow of primary air into the combustion chamber must be increased to make the fuel mixture in the primary zone leaner and to decrease the dwell time of the combustion gases in the combustion chamber. Therefore, it can be seen that the air flow near the fuel injectors must be modulated in relation to the operational mode of the engine.

French Patent 2,270,448 discloses a combustion chamber wherein a bellows-mounted membrane hermetically closes the air intake of the air swirler associated with the fuel injector. As the engine power and operational speed increase, the air pressure in the intake also increases. As a result, the membrane is forced backward to open the swirler air intakes. In this combustion chamber structure, the oxidizer air from the compressor is fed in a counterflow relationship to the flow of the combustion gases.

French Patents 2,661,714 and 2,676,529 disclose swirler regulators comprising pivoting rings jointly controlled by either mechanically (by cams) or by pressure from the combustion chamber gases.

SUMMARY OF THE INVENTION

A burner is disclosed for a combustion chamber of a gas turbine engine having a fuel injector mounted in an end of the combustion chamber for injecting fuel into the combustion chamber, the fuel injector having an associated air swirler for feeding primary air into the combustion chamber to mix with the fuel, and at least one fuel feed tube for supplying fuel, with an end of the fuel feed tube spaced from the fuel injector nozzle. A control member for controlling the amount of air entering the air swirler is located between the fuel injector nozzle and the end of the fuel feed tube, the control member having a passage to pass fuel from the fuel feed tube to the fuel injector nozzle. The control member is attached to the end of the fuel feed tube by an elastic bellows having a cross-sectional dimension D1 and to the fuel injector nozzle by a second elastic bellows having a cross-sectional dimension D2 such that D2>D1. When the fuel pressure in the passage is below a predetermined value, such as a under low operating conditions, the control member is moved towards the fuel injector so as to restrict the amount of air passing through the air swirler, thereby richening the mixture in the combustion chamber. As the engine operating speed increases, the fuel pressure in the passage also increases which causes movement of the control member away from the fuel injector towards the end of the fuel feed tube, thereby opening the intakes of the air swirler. At a predetermined maximum value, the control member is displaced so as to permit a maximum amount of air to enter the combustion chamber, thereby resulting in a lean fuel/air mixture within the combustion chamber.

It is object of the present invention to provide a burner for a combustion chamber having regulating means that is stable at both low and high speed engine operation, and in which the control acts as a function of the fuel feed pressure independently of any other burner associated with the combustion chamber. Each burner is independently controlled so as to maximize the fuel/air mixture at an adjacent portion of the combustion chamber.

Stops may be incorporated to limit the extreme positions of the control member and provide a stable operation for both very low power operating conditions and very high power operating conditions. Each burner is an integral module independent of any other burners and is independently regulated within its operating range. The regulation of each burner module can be implemented outside of the combustion chamber, or outside of the engine, thereby allowing changing of the engine without affecting injectors of the combustion zone. Development and testing of such a burner for an annular combustion chamber may be carried out using a tubular combustion zone.

DETAILED DESCRIPTION OF PREFERRED EMBODIMENTS

Figure 1:
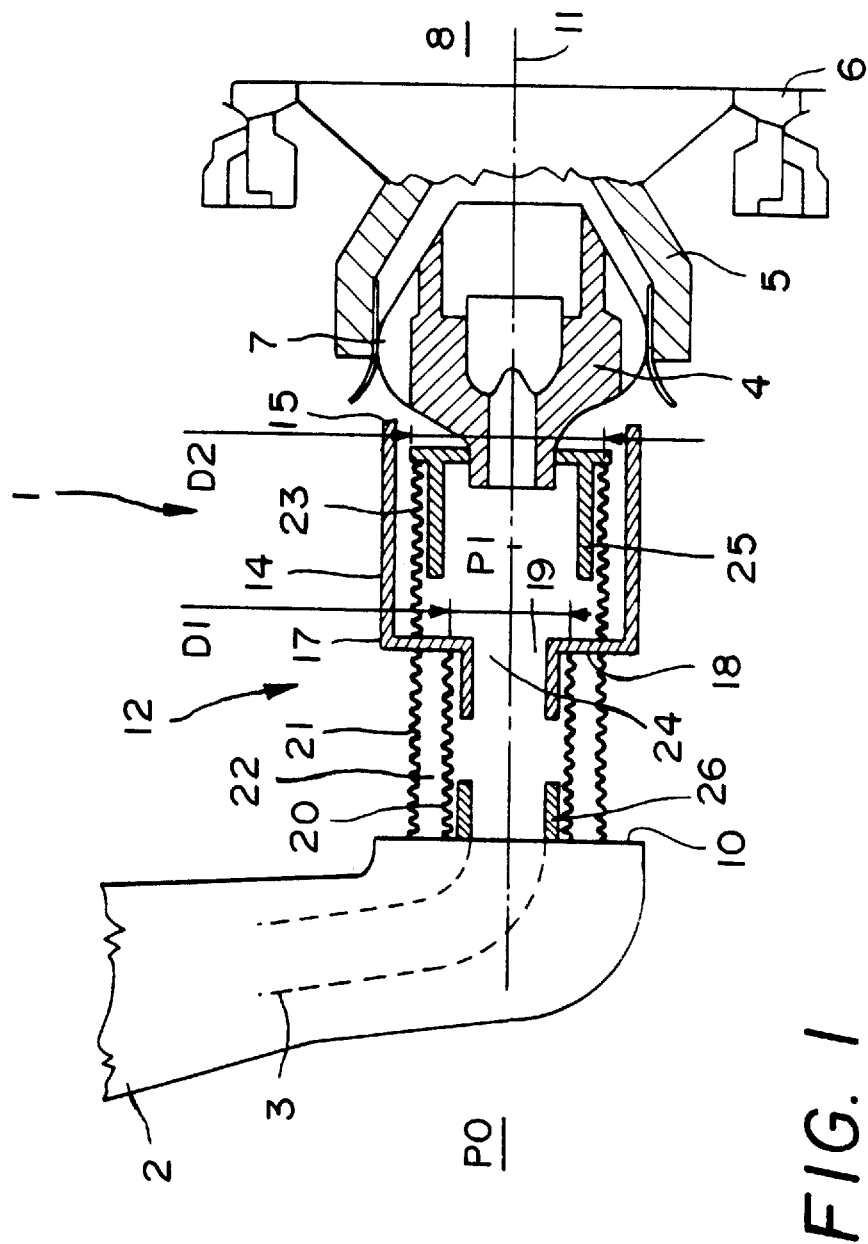
FIG. 1 is a cross-sectional view of a burner according to the present invention having a single fuel feed tube.

FIG. 1 illustrates a burner 1 for supplying a fuel/air mixture to a combustion zone 8 of a combustion chamber for a gas turbine engine (not shown). The burner 1 comprises a housing 2 affixed to the gas turbine engine in which is mounted a fuel feed tube 3 having an end 10 and which is connected to a source of fuel (not shown). The burner also comprises a fuel injector or nozzle 4 mounted in a dome 5 affixed to the end 6 of the combustion chamber in known fashion. The fuel injector 4 has an air swirler 7 associated therewith for supplying a flow of turbulent primary air for taking part in the shearing and the atomization of the fuel spray delivered through the nozzle 4, and to take part in the combustion of the fuel in the combustion zone 8.

As can be seen, the nozzle 4 is spaced apart from the end 10 of the housing 2 and the end of the fuel feed tube 3 wherein the end 10 extends substantially perpendicular to the longitudinal axis 11 of the fuel injector 4. The control assembly 12 is located between the fuel injector 4 and the end 10, and is configured to carry out multiple functions: to feed fuel from the end of the fuel feed tube 3 into the fuel injector nozzle 4; regulation of the intakes of the airflow swirler 7; and to regulate the air intakes for the swirlers 7 as a function of fuel pressure P1 from the fuel feed tube 3.

The control assembly comprises a control member 14 generally centrally located on the axis 11 having a rear or downstream extending rim 15 that extends from the periphery of a disk 18 oriented substantially perpendicular to the axis 11 and having a central opening 19 for the passage of fuel from the fuel feed tube 3 to the fuel injector nozzle 4. The disk 18 is connected to the end of the fuel feed tube housing by coaxial elastic bellows 20 and 21 which define a hermetically sealed space 22 therebetween and to the nozzle 4 by an elastic bellows 23. The bellows 20, 21 and 23 may be made of a metallic material, or any other material that will deform under the variations of the fuel pressure P1 within the control member 14. The bellows 20 and 23 prevent fuel leaking from the device and insure continuity of the passage 24 between the fuel feed tube 3 and the fuel injector nozzle 4 and bound the passage 24 through which the fuel flows.

The cross-sectional diameter D2 of the bellows 23 is larger than the cross-sectional diameter D1 of the bellows 20. The force F generated by the pressure P1 on the disk 18 is directed in a forward direction (towards the left as viewed in FIG. 1) and is equal to $(P1) (\pi) (D2-D1)^2$. As a result, as the pressure P1 within the control member increases, the control member 14 is moved forward towards the housing 2.

Stops 25 and 26 may be attached to the fuel injector nozzle 4 and to the housing end 10, respectively, to limit the movement of the control member 14 between a shut off position, in which the control member 18 contacts the stop 25 and a maximum open position in which the disk abuts against the stop 26. Fuel pressures P1 between the minimum and maximum value will result in the control member 14 being positioned between the stops 25 and 26. Since the disk abuts the stops 25 or 26 in the low power and high power operating modes, the position of the control member 14 is stable under these extreme operating conditions.

When the engine operates at low power, the fuel rate is also low, as is the fuel pressure P1. The force F applied to the bellows 20 and 23 is also relatively low. Under these conditions, the disk 18 rests against the stop 25 and the control member 14 minimizes the airflow passing through the swirlers 7 into the combustion zone, thereby increasing the richness of the fuel/air mixture in the combustion zone.

When the engine is operating at full power, both the fuel flow and the fuel pressure P1 are high. The force exerted on the disk 18 is also high causing the disk 18 to abut against the stop 26. In this position, the control member 14 is in its maximum open position enabling the maximum amount of air to pass through the swirler 7 making the fuel/air mixture in the combustion zone 8 leaner.

Figure 2:
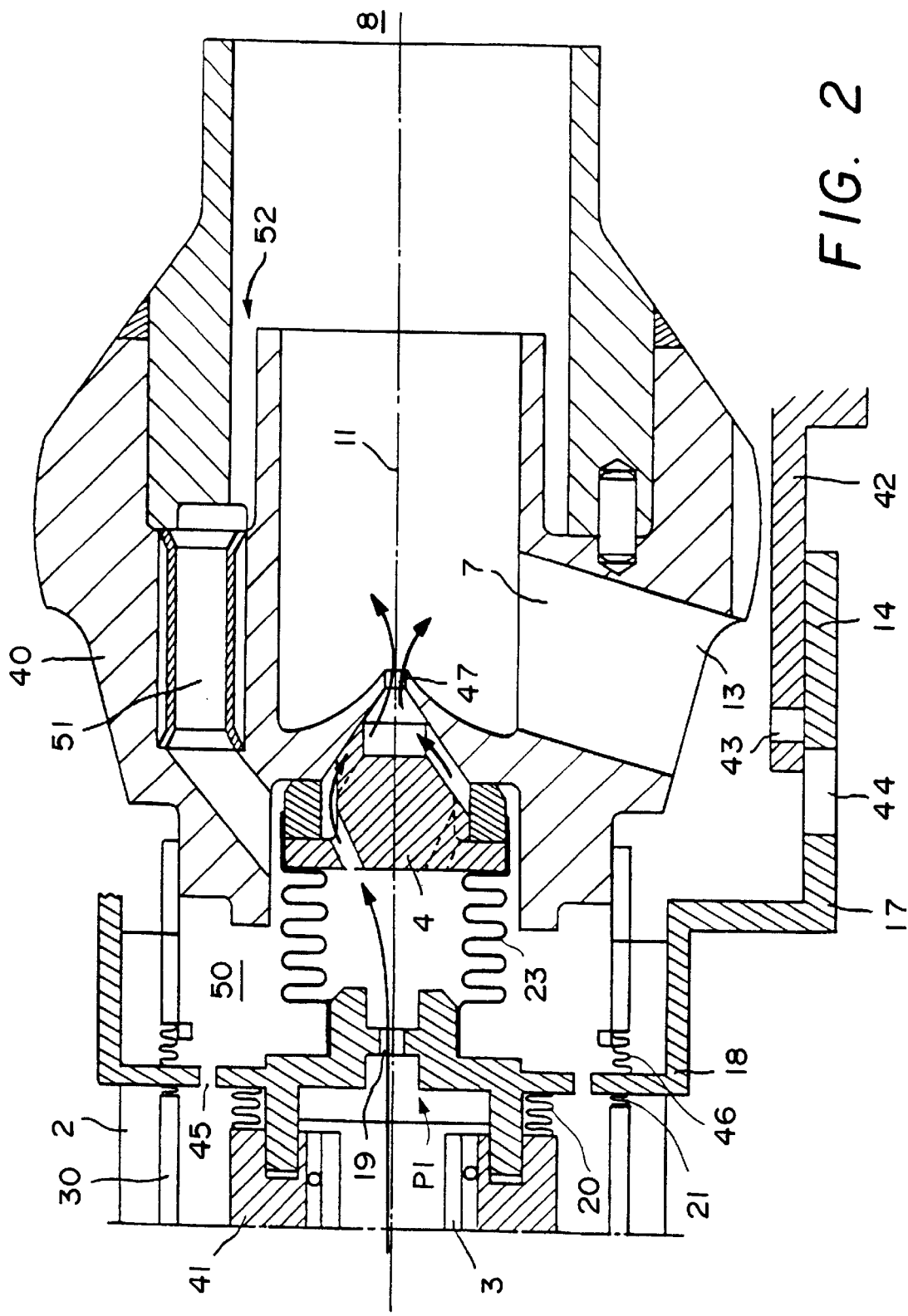
FIG. 2 is a cross-sectional view of a burner according to the present invention utilizing a dual fuel flow tube with the elements in their low power operating positions.
Figure 3:
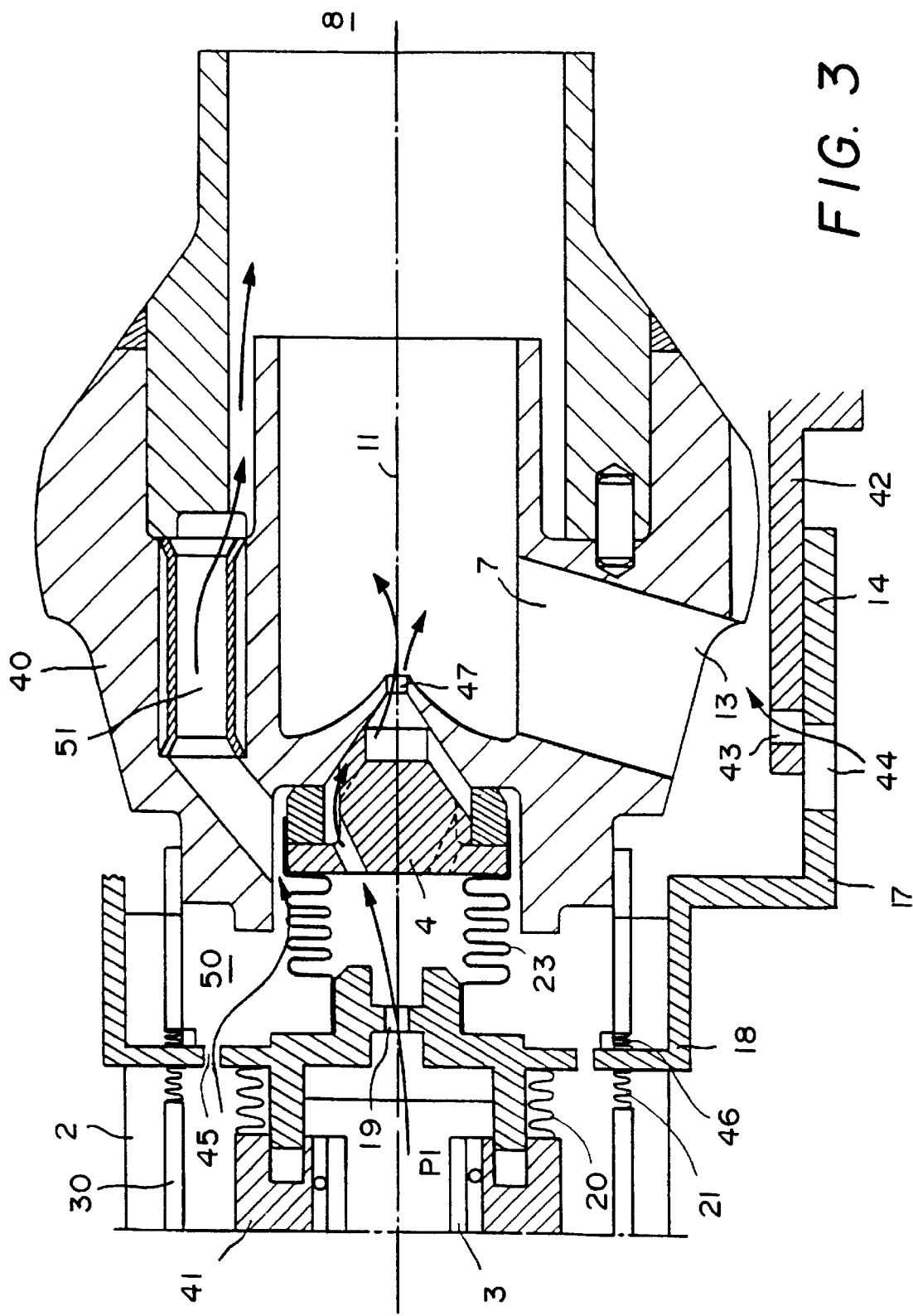
FIG. 3 is a cross-sectional view similar to FIG. 2, but illustrating the elements in their high power operating positions

FIGS. 2 and 3 illustrate a variation of the invention configured to control a dual output fuel injector 1 with dual fuel feed tubes. In these figures, elements having the same function and/or structure as in the previously described embodiment are assigned the same identifying numerals.

The particular fuel injector 1 illustrated has two entirely separate fuel circuits, one for low power operation and the other for full power operation. The first fuel circuit comprises a fuel feed tube 3, again mounted in a housing 2 and issuing fuel along the longitudinal axis 11 of a mechanical fuel injector nozzle 4, again spaced apart in a direction from the rear of the feed tube 3. The second fuel circuit comprises a second fuel feed tube 30, generally coaxially enclosing the first fuel feed tube 3 and passages 51 forming an aerodynamic fuel injector nozzle 40 enclosing the fuel injector nozzle 4. A swirler 7 is associated with the second aerodynamic fuel injector nozzle 40. A support 41 is provided in the housing tube between the inner fuel feed tube 3 and the fuel feed tube 30. Element 42 comprises a fixed portion of the combustion chamber structure having orifices 43 located opposite to the inlet openings 13 of swirler 7. As in the previous embodiment, control member 14 is movably mounted between the fuel injectors and the fuel feed tubes, and is slidably located on the structure 42. Control member 14 has openings 44 whose position relative to the orifices 43 may be adjusted as the control member 14 moves between the fuel injector and the fuel feed tubes. A forward, or upstream, end 17 of the control member 4 is affixed to the periphery of disk member 18 having a central opening 19 to enable passage of fuel from the fuel feed tube 3 to the fuel injector nozzle 4. The structure 42 is centered on the fuel injector nozzle 40 which, in turn, is fixedly connected to the housing 2.

The disk 18 is connected to the housing 2 by two coaxial elastic bellows 20 and 21 which are spaced apart so as to form a first space therebetween through which passes the fuel from the fuel feed tube 30. Openings 45 in the disk 18 enable the fuel to pass through the disk into space 50 formed between the coaxial and elastic bellows 23 and 46. Space 50 communicates with the passages 51 which, in turn, are connected to the annular space 52. Space 52 communicates with the combustion zone 8 of the combustion chamber.

When the engine is operating in the low power mode, the disk 18 rests against the support 41, as illustrated in FIG. 2. In this mode, fuel passes only through fuel feed tube 3, through the passage 19 and into the fuel injector 4 and is at relatively low pressure. The fuel passes through the injection orifice 47 into the combustion chamber. Inner bellows 20 and 23 bound the first fuel passage between the feed tube 3 and the fuel injector nozzle 4. At low power, the force generated by the fuel pressure on the forward, or upstream side of the disk 18 is insufficient to deform the bellows 20, 21, 23 and 46 and is therefore insufficient to more the control member 14. Thus, the orifices 43 are closed by the control member 14 thereby minimizing the amount of air passing into the swirler 7 through its intake 13, resulting in an increase richness of the fuel/air mixture in the low power mode.

When the engine operates at full power, the fuel pressure rises in the previously described low power circuit and is sufficient to move the disk 18 to the rear (towards the right as view in FIGS. 2 and 3) by deforming the bellows 20, 21, 23 and 46. The second fuel circuit is aerodynamic and fuel fed from the fuel feed tube 30 passes through the openings 45, into chamber 50, through passages 51 and through the annular feed slot 52. The rearward displacement of the disk 18 and the control member 14 brings openings 44 into alignment with the orifices 43, thereby increasing the amount of air passing through the swirler 7. In this manner, additional flow of primary air will be fed to the combustion zone 8 to make the fuel/air mixture leaner.

The positions and diameters of the bellows 20, 21, 23 and 46 are selected such that the two fuel feed circuits are insulated from each and that the fuel pressures will act on the bellows and the disk 18 in the above-described manner.

The foregoing description is provided for illustrative purposes only and should note be construed as in any way limited this invention, the scope of which is defined solely by the appended claims.

We claim:

1. A burner for a combustion chamber of a gas turbine engine comprising:

a) a fuel injector mounted in an end of the combustion chamber for injecting fuel into the combustion chamber having an air swirler associated therewith for feeding primary air into the combustion chamber to mix with the fuel;

b) at least one fuel feed tube for supplying fuel, an end of the at least one fuel feed tube spaced from the fuel injector nozzle;

c) a control member for controlling the amount of air entering the air swirler located between the fuel injector nozzle and the end of the fuel feed tube, the control member having a passage to pass fuel from the fuel feed tube to the fuel injector nozzle;

d) a first elastic bellows connecting the control member to the fuel supply tube and having cross-sectional dimension $D_1$; and, e) a second elastic bellows connecting the control member to the fuel injector nozzle and having a cross-sectional dimension $D_2$ such that $D_2 > D_1$, whereby fuel pressure in the passage below a predetermined low value causes the movement of the control member towards the fuel injector nozzle thereby allowing a minimum amount of air to enter the combustion chamber and fuel pressure in the passage above a predetermined high value moves the control member away from the fuel injector nozzle thereby allowing a maximum amount of air to enter the combustion chamber.

2. The burner of claim 1 further comprising a third elastic bellows extending generally concentrically around the first elastic bellows so as to form a first space therebetween, the third elastic bellows connecting the control member to the fuel feed tubes.

3. The burner of claim 1 further comprising a first stop limiting the movement of the control member towards the fuel injector.

4. The burner of claim 3 further comprising a second stop limiting the movement of the control member towards the fuel feed tube.

5. The burner of claim 2 further comprising a fourth elastic bellows extending generally concentrically around the second elastic bellows so as to form a second space therebetween, the fourth elastic bellows connecting the control member to the fuel injector.

6. The burner of claim 5 further comprising first and second fuel feed tubes, the second fuel feed tube supplying fuel to the fuel injector nozzle through the first and second spaces.

7. The burner of claim 6 wherein the first and second fuel feed tubes are generally concentric.

* * * * *

UNITED STATES PATENT AND TRADEMARK OFFICE
CERTIFICATE OF CORRECTION

PATENT NO. : 5,829,244
DATED : November 3, 1998
INVENTOR(S) : Ciccia et al.

It is certified that error appears in the above-indentified patent and that said Letters Patent is hereby corrected as shown below:

On the title page, :
Item [73] Assignee: "Valin, France" should read --Paris, France--.

Signed and Sealed this

Sixth Day of July, 1999

Attest:

Q. TODD DICKINSON

Attesting Officer

Acting Commissioner of Patents and Trademarks